United States Patent
Husemann et al.

(10) Patent No.: US 9,957,423 B2
(45) Date of Patent: May 1, 2018

(54) USE OF PRESSURE-SENSITIVE ADHESIVE TAPES FOR OPTICAL APPLICATIONS

(71) Applicant: TESA SE, Hamburg (DE)

(72) Inventors: Marc Husemann, Hamburg (DE); Jan Ellinger, Hamburg (DE); Matthias Koop, Norderstedt (DE); Niko Lübbert, Hamburg (DE)

(73) Assignee: TESA SE, Norderstedt (DE)

( * ) Notice: Subject to any disclaimer, the term of this patent is extended or adjusted under 35 U.S.C. 154(b) by 0 days. days.

(21) Appl. No.: 14/916,348

(22) PCT Filed: Aug. 22, 2014

(86) PCT No.: PCT/EP2014/067935
§ 371 (c)(1),
(2) Date: Mar. 3, 2016

(87) PCT Pub. No.: WO2015/032635
PCT Pub. Date: Mar. 12, 2015

(65) Prior Publication Data
US 2016/0200947 A1    Jul. 14, 2016

(30) Foreign Application Priority Data
Sep. 5, 2013   (DE) .................. 10 2013 217 785

(51) Int. Cl.
| | | |
|---|---|---|
| C09J 7/02 | (2006.01) | |
| C09J 133/06 | (2006.01) | |
| C09J 5/00 | (2006.01) | |
| C09J 133/14 | (2006.01) | |
| C09J 11/06 | (2006.01) | |
| C09J 133/04 | (2006.01) | |
| C08K 5/11 | (2006.01) | |
| C08K 5/20 | (2006.01) | |
| C08K 5/3435 | (2006.01) | |
| C08K 5/3475 | (2006.01) | |

(52) U.S. Cl.
CPC .............. *C09J 133/06* (2013.01); *C09J 5/00* (2013.01); *C09J 7/0217* (2013.01); *C09J 11/06* (2013.01); *C09J 133/04* (2013.01); *C09J 133/14* (2013.01); *C08K 5/11* (2013.01); *C08K 5/20* (2013.01); *C08K 5/3435* (2013.01); *C08K 5/3475* (2013.01); *C08L 2201/08* (2013.01); *C09J 2203/326* (2013.01); *C09J 2205/102* (2013.01); *C09J 2205/106* (2013.01); *C09J 2433/00* (2013.01)

(58) Field of Classification Search
None
See application file for complete search history.

(56) References Cited

U.S. PATENT DOCUMENTS

| | | | | |
|---|---|---|---|---|
| 2001/0022965 | A1* | 9/2001 | Heger ..................... | A61K 8/042 424/59 |
| 2003/0124346 | A1* | 7/2003 | Yamanaka ............. | C09J 7/0217 428/355 AC |
| 2005/0130527 | A1* | 6/2005 | Sebastian ................... | C09J 7/04 442/149 |
| 2009/0252979 | A1* | 10/2009 | Ferreiro ................... | B32B 1/08 428/474.7 |
| 2011/0187970 | A1* | 8/2011 | Kim ....................... | C08F 220/18 349/96 |
| 2013/0085215 | A1* | 4/2013 | Shitara ................... | C09J 7/0217 524/100 |

FOREIGN PATENT DOCUMENTS

| | | |
|---|---|---|
| CN | 101570677 A | 11/2009 |
| CN | 101993666 A | 3/2011 |
| CN | 103031071 A | 4/2013 |
| DE | 10110612 A1 | 9/2002 |
| EP | 1323802 A2 | 7/2003 |
| EP | 2186849 A1 | 5/2010 |
| EP | 2284388 A1 | 2/2011 |
| WO | 9855555 A1 | 12/1998 |

OTHER PUBLICATIONS

Definition "Derivative" from Merriam Webster Dictionary online, retrived on Jun. 7, 2017.*
Reference sheet "Dimethyl succinate" from National Institute of Standards and Technology (NIST), retrived on Jun. 7, 2017.*
Material Safety Data Sheet for "Tinuvin 312", Ciba Specialty Chemicals Corporation, retrived on Jun. 7, 2017.*
English translation of International Search Report for corresponding application PCT/EP2014/067935 dated Jan. 7, 2015.
German Search report for corresponding application DE 10 2013 217 785.2 dated Apr. 11, 2014.
English translation of CN Office Action for corresponding application CN 201480060696.5 dated Jul. 19, 2017.
English summary of TW Office Action for corresponding application TW 103129279 dated Feb. 6, 2018, prepared by Taiwanese attorneys.

* cited by examiner

*Primary Examiner* — Anish Desai
(74) *Attorney, Agent, or Firm* — Norris McLaughlin & Marcus PA

(57) ABSTRACT

The invention relates to an adhesive tape comprising at least one layer of a pressure-sensitive acrylate adhesive comprising a polymer component and at least one additive, where the polymer component is composed of one or more copolymers each based on the following monomers: a) from 5 to 35% by weight of one or more monomers containing hydroxy groups and having a copolymerizable double bond; b) from 0 to 50% by weight of one or more acrylate and/or methacrylate monomers each having at least one amide group, urethane group, urea group, or carboxylic anhydride unit and/or ethylene glycol unit, c) from 15 to 95% by weight of an alkyl (meth)acrylate, where the alkyl moiety has from 1 to 14 carbon atoms, where the pressure-sensitive acrylate adhesive comprises one or more 2-(2H-Benzotriazol-2-yl) derivatives admixed as additive; and also a corresponding adhesive.

15 Claims, No Drawings

USE OF PRESSURE-SENSITIVE ADHESIVE TAPES FOR OPTICAL APPLICATIONS

This application is a § 371 U.S. National stage of PCT International Patent Application No. PCT/EP2014/067935, filed Aug. 22, 2014, which claims foreign priority benefit of German Patent Application No. DE 10 2013 217 785.2, filed Sep. 5, 2013, the disclosures of each of which patent applications are incorporated herein by reference.

Adhesive tapes in the age of industrialization are widespread working assistants. Especially for use in the electronics industry, such adhesive tapes are employed very frequently. In these applications, there are always fairly specific requirements these adhesive tapes must meet. Particularly in the field of the displays of electronic devices, in addition to the adhesive bonding, a wide variety of different requirements are imposed in relation to light management. Hence adhesive tapes are required to be light-reflecting, light-absorbing, or highly transparent.

One specialty area of use is in the bonding of touch-sensitive screens ("touch panels"—this term will be used hereinafter). Panels of this kind are increasingly being used in order to facilitate data input and also to allow the electronic devices to be made smaller.

The touch panel is bonded to the display unit directly or to the window of the electronic device, particularly a portable electronic device. Accordingly, very high requirements are imposed in relation to transparency and cleanness, so that there is no reduction in the light yield of the image generated by the display. Moreover, the use of capacitive touch panels is on the rise, since these panels have advantages in terms of precision.

In connection with capacitive touch panels, for example, indium tin oxide films (ITO films) are used, which generate the electrical field for the touch panel function. The requirements imposed on an adhesive tape provided for the bonding of such subassemblies are relatively high. The tape must be highly transparent—accordingly, optically clear adhesives, also known under the name OCA, are primarily used; it must not interact with the ITO film, and it must not influence the electrical conductivity. A further problem arises from the fact that the ITO film is exposed to the UV radiation in daylight and is damaged as a result; in particular, the UV radiation can lead to instances of discoloration of the ITO film. UV radiation, however, is usually absorbed little or not at all by optically clear adhesive. Desirable accordingly are adhesives which at the same time have a UV-filtering effect.

Optically clear adhesives with UV absorbers, and products produced from them, are already known (US 2013/0085215). They nevertheless have disadvantages in terms of thermal stability—that is, these products yellow under thermal load. These products do not take account of the absorption of light of the UV-C spectrum, and problems resulting from this are not recognized. This shortwave UV region, however, is relatively high in energy. UV-C light may therefore cause great damage even in a relatively short time. It is therefore desirable to offer an optically clear adhesive of a kind which is also able to absorb light in the UV-C wavelength range.

It is an object of the invention, therefore, to provide a pressure-sensitive adhesive tape for optical applications that has UV-absorbing properties, that does not influence the electrical conductivity of ITO films, and that minimizes the yellow coloration of ITO films. An adhesive tape of this kind ought advantageously to exhibit a b* value of less than 1 in the Lab color space on hot storage at 70° C. and relative humidity of not more than 10% for one month and/or at 85° C. and 85% r.h. for 1000 h.

The object is outstandingly achieved by a pressure-sensitive adhesive tape comprising at least one layer of a pressure-sensitive acrylate adhesive,
the polymer component of said adhesive being formed of one or more copolymers assignable in each case to the following monomers:
a) 5 to 35 wt % of one or more hydroxyl-containing monomers with copolymerizable double bond,
b) 0 to 50 wt % of one or more acrylate and/or methacrylate monomers with in each case at least one amide group, urethane group, urea group, carboxylic anhydride unit and/or ethylene glycol unit,
c) 15 to 95 wt % of an alkyl (meth)acrylate, the alkyl radical having one to 14 carbon atoms,
the pressure-sensitive acrylate adhesive having been admixed with at least one 2-(2H-benzotriazol-2-yl) derivative (also referred to below as "additive 1"), preferably in an amount such that the product of the thickness of the layer of pressure-sensitive acrylate adhesive and the amount of the admixed additive 1 per 100 g of the polymer component is in the range from 75 to 200 g*μm (1 g*μm=$10^{-9}$ kg*m).

Where within this specification parameters are specified in a range which is defined by two limits, the limiting values indicated are considered as belonging to the parameter range, provided nothing to the contrary is stated.

Pressure-sensitive adhesives (PSAs) are more particularly those polymeric compositions which—possibly as a result of appropriate additization with further components, such as tackifier resins, for example—at the application temperature (at room temperature, unless otherwise defined) are durably tacky and permanently adhesive and attach on contact to a multiplicity of surfaces, more particularly attaching immediately (exhibiting what is called "tack" [stickiness or touch-adhesiveness]). They are capable, even at the application temperature without any activation by solvent or by heat—but customarily through the influence of a greater or lesser pressure—of wetting a substrate for bonding to a sufficient extent that interactions sufficient to the adhesion are able to develop between the composition and the substrate. Key influencing parameters for this include the pressure and the contact time. The particular properties of the PSAs originate in particular from their viscoelastic properties, among others.

PSAs comprise at least one or a plurality of polymers (for the purposes of this specification, the polymers jointly are referred to as the "polymer component" of the PSA), which may be homopolymers and/or comonomers of various monomers polymerizable with one another. The polymer component may inherently have pressure-sensitively adhesive properties already, or may acquire such properties only after appropriate additization, by means of resins, for example.

The polymer component may fundamentally be produced on the basis of polymers of various chemical natures. The pressure-sensitive adhesive properties may be influenced by factors including the nature and the proportions of the monomers used in the polymerization of the PSA's parent polymers, their average molar mass and molar mass distribution, and by the nature and amount of the adjuvants to the PSA, such as tackifier resins, plasticizers, and the like.

Resins in the sense of this specification are seen as being oligomeric and polymeric compounds having a number-average molecular weight $M_n$ of not more than 10 000 g/mol; they are not reckoned to the polymer component.

For the purpose of obtaining the viscoelastic properties, the monomers on which the PSA's parent polymers are based, and also the further components of the PSA, where they are present, are selected more particularly such that the PSA has a glass transition temperature (according to DIN 53765) below the application temperature (in other words, usually, below the room temperature).

By means of suitable cohesion-boosting measures, such as crosslinking reactions (formation of bridge-forming linkages between the macromolecules), for example, it is possible to enlarge and/or shift the temperature range within which a polymer composition has pressure-sensitively adhesive properties. The application range of the PSAs may therefore be optimized by an adjustment between fluidity and cohesion of the composition.

The pressure-sensitive adhesive tape of the invention may be of single-sidedly adhesive design; customarily, however, it will be an adhesive tape provided with double-sided adhesion. The adhesive tape may have one or more carrier layers, with at least one of the outer layers of adhesive—preferably, in the case of double-sided, carrier-containing adhesive tapes, both outer layers of adhesive—being based on the above-described polymer component and more particularly being identical.

Especially advantageous are double-sided, carrier-free adhesive tapes, especially those adhesive tapes formed exclusively of the acrylate PSA layer described in accordance with the invention.

With preference the weight-average molecular weight $M_w$ of the polymer or polymers of the polymer component is situated in each case in the range of $200\,000 \leq M_w \leq 3\,000\,000$ g/mol. Data on the weight-average molecular weight $M_w$ are based on the determination by gel permeation chromatography (GPC). The eluent used was THF with 0.1 vol % of trifluoroacetic acid. The measurement took place at 25° C. The pre column used was PSS-SDV, 5μ, $10^3$ Å, ID 8.0 mm×50 mm. Separation took place using the columns PSS-SDV, 5μ, $10^3$ and also $10^5$ and $10^6$ each with ID 8.0 mm×300 mm. The sample concentration was 4 g/l, the flow rate 1.0 ml per minute. Measurement took place against PMMA standards. (μ=μm; 1 Å=$10^{-10}$ m).

Essential for the absorption behavior of the acrylate PSA layer is the amount of UV absorbers actually present in an areal section of this layer. If the layer of composition is thicker, the concentration of absorbers in the adhesive can be lower; if the layer of composition is thin, then a high concentration of absorber is necessary for a corresponding absorption effect to occur. A substantially antiproportional relation has emerged between thickness and amount of additives so that the absorption effect of the layer of composition is obtained in the manner desired.

The product of the thickness of the adhesive tape and the amount of the absorber (in parts by weight) per defined unit amount of the polymer component (presently 100 parts by weight) is therefore characteristic of the absorption effect of the corresponding layer of composition, and corresponds to the amount of additive, standardized to 100 parts by weight (presently 100 g), per reciprocal thickness.

This means that an acrylate PSA layer 100 μm thick preferably has an amount of 0.75 to 2 parts by weight of 2-(2H-benzotriazol-2-yl) derivatives in addition to 100 parts by weight of the polymer component, while an acrylate PSA layer 50 μm thick ought preferably to have an amount of 1.5 to 4 parts by weight of "additives 1" in addition to 100 parts by weight of the polymer component. An acrylate PSA layer 200 μm thick, accordingly, preferably has an amount of 0.375 to 1 part by weight of "additives 1" in addition to 100 parts by weight of the polymer component.

The adhesive tape preferably has a thickness of between 10 and 500 μm, very preferably between 25 μm and 250 μm.

In an exceptionally preferred procedure, the acrylate adhesive of the PSA layer has been admixed, moreover, with at least one [3,5-bis(1,1-dimethylethyl-4-hydroxy phenyl) methyl]alkylmalonate derivative (also identified hereinafter as "additive 2"), in an amount such that the product of the thickness of the acrylate PSA layer and the amount of the admixed additive 2, based on 100 g of the polymer component in each case, is in the range from 25 to 200 g*μm. Accordingly, an acrylate PSA layer 100 thick would contain an amount of 0.25 to 2 parts by weight of "additive 2" in addition to 100 parts by weight of polymer component, and corresponding amount in accordance with the antiproportional relationship between preferred amount of additive and layer thickness for other adhesive tape thicknesses.

In a preferred procedure, additive 1 is present at 75 to 175 g*μm, very preferably at 75 to 150 g*μm, based in each case on 100 g of the polymer component.

In another preferred procedure, additive 2 is present at 40 to 150 g*μm, based on 100 g of the polymer component.

Especially advantageously, additive 1 is present at 75 to 175 g*μm, more advantageously at 75 to 150 g*μm, and at the same time additive 2 is present at 40 to 150 g*μm, based in each case on 100 g of the polymer component.

In one advantageous embodiment of the invention the adhesive, as well as with the additive 1 and/or preferably as well as with the additives 1 and 2, has been admixed with at least one diaromatically functionalized ethanediamide derivative (also referred to below as "additive 3"), at 25 to 200 g*μm, preferably between 40 and 150 g*μm, based on 100 g of the polymer component.

Correspondingly, an acrylate PSA layer 100 μm thick would contain an amount of 0.25 to 2 parts by weight, preferably from 0.4 to 1.5 parts by weight, of "additive 3" in addition to 100 parts by weight of polymer component, and corresponding amount in accordance with the antiproportional relationship between the preferred amount of additive and layer thickness for other adhesive tape thicknesses.

In a further very advantageous embodiment of the invention, the acrylate PSA layer, as well as with the additive 1 or, preferably, as well as with the additives 1 and 2 and/or, preferably, as well as with the additives 1, 2 and 3, has had added to it at least one sterically hindered piperidine derivative (also referred to below as "additive 4"), in an amount such that the product of the thickness of the acrylate PSA layer and the amount of the admixed additive 2, based on 100 g of the polymer component in each case, is in the range from 25 to 200 g*μm, preferably in the range from 40 to 150 g*μm. Correspondingly, an acrylate PSA layer 100 μm thick would contain an amount of 0.25 to 2 parts by weight, preferably from 0.4 to 1.5 parts by weight, of additive 4 to 100 parts by weight of polymer component, and corresponding amount in accordance with the antiproportional relationship between the preferred amount of additive and layer thickness for other adhesive tape thicknesses.

Correspondingly, an acrylate PSA layer 100 μm thick would contain an amount of 0.25 to 2 parts by weight, preferably from 0.4 to 1.5 parts by weight, of "additive 4" in addition to 100 parts by weight of polymer component, and corresponding amount in accordance with the antiproportional relationship between the preferred amount of additive and layer thickness for other adhesive tape thicknesses.

Surprisingly it has emerged that the added additives neither cause substantially deleterious alteration to the technical adhesive properties of the additized adhesives, nor possess any deleterious effect on the ITO layer when the adhesive is in direct contact with such a layer. If amounts higher than those specified in this text are used, there may be relatively severe yellowing of the adhesives under aging conditions. Smaller amounts customarily do not any longer meet the requirements for low transmission at 360 and 260 nm wavelength.

Further provided by the invention is an adhesive for producing a layer of pressure-sensitive acrylate adhesive, as described above. These adhesives are pressure-sensitive acrylate adhesives whose polymer component is formed of one or more copolymers each assignable to the following monomers:
  a) 5 to 35 wt % of one or more hydroxyl-containing monomers with copolymerizable double bond,
  b) optionally 0 to 50 wt % of one or more acrylate and/or methacrylate monomers with in each case at least one amide group, urethane group, urea group, carboxylic anhydride unit and/or ethylene glycol unit,
  c) 15 to 95 wt % of an alkyl acrylate, the alkyl radical having 1 to 14 carbon atoms,
and where the acrylate PSA has been admixed with at least one 2-(2H-benzotriazol-2-yl) derivative ("additive 1"), and very advantageously also, furthermore, with at least one [3,5-bis(1,1-dimethylethyl-4-hydroxyphenyl)methyl]alkyl-malonate derivative ("additive 2"). Advantageously the acrylate PSA may have been further admixed with at least one diaromatically functionalized ethanediamide derivative ("additive 3") and/or at least one hindered piperidine derivative ("additive 4"). All of the embodiments relating to the adhesive shaped in layer form in the context of the adhesive tape of the invention are referenced accordingly, and so are also to be taken as disclosed for the adhesive as such.

The PSAs described in accordance with the invention in this text are outstandingly suitable for use as optically clear adhesives for bonding in the area of display units of electronic devices, more particularly as a layer of adhesive in adhesive tapes, and very particularly as a single-layer adhesive tape.

A high transmittance at 550 nm ensures the necessary transmissiveness for light within this range. Low transmittances at 260 nm and at 360 nm are evidence of the filtering effect of harmful UV light. The Lab color space is a color space which covers the region of perceptible colors (see DIN EN ISO 11664-4). It has been found that in particular the b* value correlates with the perceptible degree of yellowing. b* values of more than 1 are perceived as significant yellow coloration and are therefore undesirable. With the term "haze", in accordance with ASTM D1003-00, a description is given of the scattering of light by a body, expressed as the percentage fraction of the light that is deflected more than at a specified angle.

The PSAs of the invention are notable with particular preference for meeting, when in the form of a film 100 μm thick (i.e., single-layer adhesive tape), at least one and preferably all of the following criteria:
  at a wavelength of 550 nm, a transmittance of at least 89% or more,
  at a wavelength of 360 nm, a transmittance of at most 0.2% or less,
  at a wavelength of 260 nm, a transmittance of at most 0.2% or less, preferably of at most 0.1 or less,
  and a haze of at most 5% or less, preferably of at most 3% or less, very preferably of at most 1% or less (ASTM D1003-00; Procedure A).

The polyacrylate is polymerized in particular by free radical polymerization of the comonomers used, in accordance with polymerization processes that are known per se.

In order to determine the glass transition temperature of copolymers it is possible to employ the Fox equation (cf. T. G. Fox, Bull. Am. Phys. Soc. 1 (1956) p. 123), which states that the reciprocal glass transition temperature of the copolymer can be calculated via the weight fractions of the comonomers used and via the glass transition temperatures of the corresponding homopolymers of the comonomers:

$$1\frac{1}{T_g} = \frac{w_1}{T_{g1}} + \frac{w_2}{T_{g2}}$$

where $w_1$ and $w_2$ represent the mass fraction of the respective monomer 1 or 2 (wt %) and $T_g,1$ and $T_g,2$ represent the respective glass transition temperature of the homopolymer of the respective monomer 1 or 2, in K.

In the case of more than two comonomers, the equation can be generalized to $$\frac{1}{T_g} = \sum_n \frac{w_n}{T_{gn}}$$

In the general equation, n represents the serial number of the monomers used, $w_n$ the mass fraction of the respective monomer n, and $T_{g,n}$ the respective glass transition temperature of the homopolymer of the respective monomers n, in K.

The values for the glass transition temperatures of the corresponding homopolymers can also be taken from relevant reference work.

The polymers of the polymer component of the PSAs comprise one or more hydroxyl-containing monomers with copolymerizable double bond, at 5 to 35 wt %. Examples of suitable monomers are 2-hydroxyethyl acrylate, 2-hydroxypropyl acrylate, 2-hydroxybutyl acrylate, 2-hydroxyethyl methacrylate, 2-hydroxypropyl methacrylate, 2-hydroxybutyl methacrylate, 2-hydroxyethylacrylamide, N-hydroxypropylacrylamide. Besides hydroxyl monomers with acrylamide groups it is also possible for hydroxyl monomers with ethylene glycol units to be used. One example of this is hydroxy-terminated propylene glycol acrylate.

In the polymers of the polymer component there are optionally up to 50 wt % of one or plural acrylate and/or methacrylate monomers, each carrying at least one polar protic or basic group. These groups may be, in particular, carboxylic acid groups, carboxylic anhydride groups, amide groups, amino groups, urethane groups, or urea units. Where two or more of these functional groups are present, they may be identical or independently of one another may be selected from the stated functional groups. Examples of this very suitable in accordance with the invention are acrylic acid or methacrylic acids, N-vinylcaprolactam, N-vinylpyrrolidone, acrylamide, methacrylamide, N-alkylacrylamide, such as N-methylacrylamide, N-alkylmethacrylamides, such as N-methylmethacrylamide, for example, N-dialkylacrylamides, such as N,N-dimethylacrylamide, for example, diacetoneacrylamide, N,N-alkylmethacrylamides, such as N,N-dimethylmethacrylamide, for example. Further examples are 4-vinylpyridine, N-vinylphthalimide, N-vinylformamide. Also very suitable monomers in the sense of the monomer group (b) are monomers having (poly)ethylene glycol segments, in which case at least two ethylene glycol units are present in the monomer. The corresponding monomers may in particular be hydroxy-terminated and/or methoxylated.

Owing to impurities from the base monomers (especially the monomers from the monomer group (c)), there may be traces of acrylic acid present in the composition even when the intention per se is to forgo the monomers of the monomer group (b).

The polymers of the polymer component are assignable, moreover, to an extent of 15 to 95 wt % to one or more alkyl acrylates, the alkyl radical having, in particular, 1 to 14 carbon atoms. The hydrocarbon radical of the acrylic monomers may be branched or unbranched or cyclic, saturated or unsaturated, aliphatic or aromatic, substituted or unsubstituted.

The hydrocarbon radical of the acrylic monomers may more particularly be an alkyl or alkenyl group having one to 14 C atoms, particular advantage being possessed by hydrocarbon radicals having 4 to 10 carbon atoms. Advantageous examples of acrylic monomers which may be used in the sense of the monomer group (c) are n-butyl acrylate, n-pentyl acrylate, n-hexyl acrylate, n-heptyl acrylate, n-octyl acrylate, n-nonyl acrylate, lauryl acrylate, stearyl acrylate, behenyl acrylate, and their branched isomers, such as isobutyl acrylate, 2-ethylhexyl acrylate, isooctyl acrylate, for example.

As advantageous monomers of the monomer group (c) it is additionally possible to make use for example of methyl acrylate, methyl methacrylate, ethyl acrylate, n-butyl methacrylate, n-octyl methacrylate, 2-ethyhexyl methacrylate, isooctyl methacrylate.

Further advantageous monomers of the monomer group (c) are monofunctional acrylates and/or methacrylates of bridged cycloalkyl alcohols which have at least 6 C atoms. The cycloalkyl alcohols may also be substituted, as for example by C-1-6 alkyl groups, halogen atoms, or cyano groups. Advantageous examples of monomers of this kind are cyclohexyl methacrylate, isobornyl acrylate, isobornyl methacrylate, and 3.5-dimethyladamantyl acrylate.

A constituent of the PSAs of the invention are 2-(2H-benzotriazol-2-yl) derivatives (additive 1):

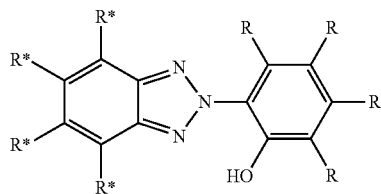

where the radicals R independently of one another and the radicals R* independently of one another and independently of the radicals R represent in each case hydrogen or inorganic or organic—aliphatic or aromatic—radicals,
where preferably the radicals R independently of one another are hydrogen or linear or branched or cyclic, aliphatic or aromatic, hydrocarbon radicals, in particular having up to 14 carbon atoms, it also being possible for the hydrocarbon radicals to be heterosubstituted, such as one or more times by nitrogen and/or sulfur and/or oxygen, and the radicals R* independently of one another represent hydrogen, halide substituents (especially advantageously Cl), or aliphatic, linear, or branched or cyclic hydrocarbon radicals having 1 to 12 carbon atoms.

Where cyclic hydrocarbon radicals are referred to at this point or elsewhere within this specification, the reference in particular is to those radicals which at some location—and not directly adjacent to the aromatic rings—have a cyclic unit, meaning that one or more carbon atoms and/or heteroatoms are disposed between this cyclic unit and the aromatic ring.

With particular preference these UV absorbers govern the UV absorption in the UV-A range. Even relatively small amounts are sufficient to achieve extremely high UV-A absorption for the adhesives suitable for optical use, without causing severe yellow coloration. Accordingly, at 360 nm, these compounds have a higher absorption efficiency than, for example, triazine compounds that are customarily used.

One preferred embodiment of the invention uses 2-(2H-benzotriazol-2-yl)phenol derivatives.

Additives 1 which are particularly preferred for use, and which may be used individually or else in combination with one another, are 2-(2H-benzotriazol-2-yl)-4,6-di-tert-pentylphenol,
the esters are branched and linear $C_7$, $C_8$, and $C_9$ alcohols with 3-(2H-benzotriazol-2-yl)-5-(1,1-dimethylethyl)-4-hydroxybenzenepropanoic acid:

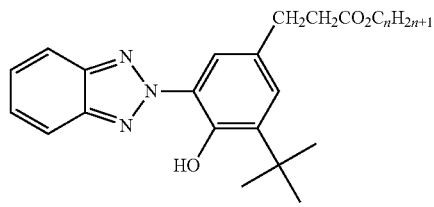

with n=7, 8, or 9; used in general as a mixture of the aforementioned esters; also available commercially in admixture of 5% 1-methoxy-2-propylacetate, 2-(2H-benzotriazol-2-yl)-6-(1-methyl-1-phenylethyl)-4-(1,1,3,3-tetramethylbutyl)phenol, octyl 3-[3-tert-butyl-4-hydroxy-5-(5-chloro-2H-benzotriazol-2-yl)phenyl]propionate.

The PSA of the invention further very preferably comprises [[3,5-bis(1,1-dimethylethyl)-4-hydroxyphenyl]methyl]alkylmalonate derivatives (additive 2):

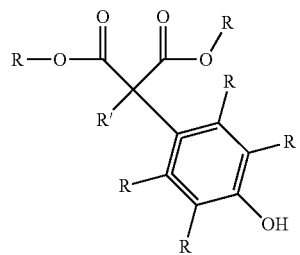

in which the radicals R and R', independently of the other radicals R and RR', each represent hydrogen or inorganic or organic aliphatic or aromatic radicals; more particularly hydrogen or linear or branched or cyclic, aliphatic or aromatic, hydrocarbon radicals, more particularly having up to 14 carbon atoms, it also being possible for the hydrocarbon radicals to be heterosubstituted, such as one or more times by nitrogen and/or sulfur and/or oxygen.

Used preferably are [[3,5-bis(1,1-dimethylethyl)-4-hydroxyphenyl]methyl]-butylmalonates (R'=$C_4H_9$). In one very preferred embodiment, piperidyl-substituted 3,5-bis[1, 1-dimethylethyl-4-hydroxyphenyl)methylbutylmalonates are used. One very advantageous example of this is bis(1,2,2,6,6-pentamethyl-4-piperidyl) [[3,5-bis(1,1-dimethylethyl)-4-hydroxyphenyl]methyl]butylmalonate, for example.

It is additionally possible, in one preferred embodiment, to add diaromatically functionalized ethane diamide derivatives (additive 3)

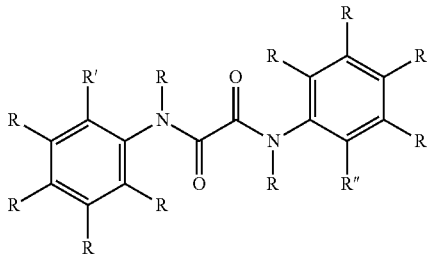

in which the radicals R and R' and R", in each case independently of the other radicals R, R' and R", represent hydrogen or linear or branched or cyclic, aliphatic or aromatic, hydrocarbon radicals, more particularly having up to 14 carbon atoms, it also being possible for the hydrocarbon radicals to be heterosubstituted, such as one or more times by nitrogen and/or sulfur and/or oxygen.

These derivatives have an effect absorbing primarily in the UV-C range, and a high light stability. In one preferred form, aromatic groups used are alkyl- or alkoxy-functionalized aromatics. One very preferred embodiment uses N-(2-ethoxyphenyl)-N'-(2-ethylphenyl)ethanediamide (R=H, R'=$C_2H_5$, R"=$OC_2H_5$ in formula above).

In another very preferred embodiment it is possible for hindered piperidine derivatives (additive 4) to be added, especially advantageously polymeric piperidine derivatives of the formula

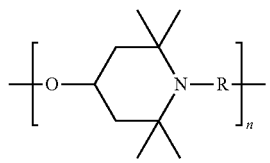

in which R represents a linear or branched hydrocarbon chain, which may also be singly or multiply heterosubstituted, more particularly by sulfur and/or oxygen and/or nitrogen. Such compounds are for example also known under the designation "HALS". The 2,2,6,6-dimethyl substitution of the piperidine ring that is represented as in the formula is one exemplary advantageous embodiment.

Particularly suitable for use in accordance with the invention are copolymers using 4-hydroxy-2,2,6,6-tetramethyl-1-piperidineethanol as comonomer:

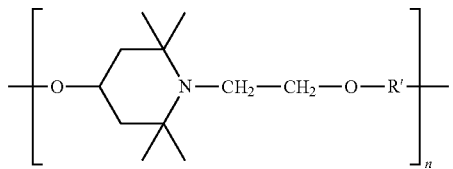

for instance the polymeric reaction product of 4-hydroxy-2,2,6,6-tetramethyl-1-piperidineethanol and of dimethyl butanedioate, with R=C(O)CH$_2$CH$_2$C(O) in the formula above.

If the cohesion of the PSA is not high enough from the outset to ensure, for example, diecuttability or to prevent the optical components slipping down in vertical operation, the PSA is crosslinked in accordance with the invention. This will normally be the case. Sufficient cohesion is also important for flawless bonds in the optical area.

PSAs are viscoelastic polymer systems. For more precise description and quantification of the degree of elastic and viscous component and also of the proportion of the components to one another, it is possible to employ the variables of storage modulus (G'), loss modulus (G"), and also the ratio G"/G', referred to as loss factor tan δ (tan delta), as determinable by means of Dynamic Mechanical Analysis (DMA). G' is a measure of the elastic component, G" a measure of the viscous component, of a substance. Both variables are dependent on the deformation frequency and the temperature.

The loss factor tan δ is a measure of the elasticity and fluidity of the substance under analysis.

The variables can be determined using a rheometer. In that case, the material under investigation is exposed to a sinusoidally oscillating shearing stress in a plate/plate arrangement, for example. In the case of instruments controlled by shearing stress, the deformation is measured as a function of time, and the time offset of this deformation γ is measured relative to the introduction of the shearing stress τ. This time offset (phase shift between shearing stress vector and deformation vector) is referred to as the phase angle δ.

| | |
|---|---|
| Storage modulus G' | G' = τ/γ · cos(δ) |
| Loss modulus G" | G" = τ/γ · sin(δ) |
| Loss factor tan δ | tan δ = G'/G" |

The figures for the aforementioned parameters within this specification relate to the measurement by means of a rheometer in plate-on-plate configuration, based on a round sample having a sample diameter of 8 mm and a sample thickness of 1 mm. Measurement conditions: temperature sweep from –30° C. to 130° C., the tan δ is to be situated in the range between 0.05 and 1.0, preferably between 0.1 and 0.5, determined in each case at 130° C. and 10 rad/s.

The crosslinking of the polyacrylate is accomplished preferably by thermal crosslinking and/or chemical crosslinking. In order to achieve good workability, the crosslinking ought to be carried out through to a degree of crosslinking which is characterized by a loss factor (tan δ) of between 0.1 and 1.0 (Rheology test method).

The crosslinking is very preferably carried out using polyfunctional crosslinker substances (referred to below as crosslinkers) which are admixed to the PSA prior to crosslinking. Crosslinkers of this kind are able to react with suitable reactive centers in the macromolecules under the particular crosslinking conditions, and hence are able to form bridges between the macromolecules, and contribute to a network, by means of their at least two functional groups.

In one embodiment for particular preference, the polyacrylates are crosslinked thermally. In order to achieve the desired viscoelastic range it is possible for isocyanate crosslinkers, epoxy-based crosslinkers, melamine-based crosslinkers, peroxide-based crosslinkers, metal chelate-based crosslinkers, metal salt-based crosslinkers, carbodiimide-based crosslinkers, oxazoline-based crosslinkers, aziridinebased crosslinkers, amine-based crosslinkers, or silane-based crosslinkers to be used. Combination of different crosslinkers is likewise possible.

When difunctional crosslinkers are used, their proportion in the PSA is between 0.3 and 3 parts by weight, more preferably between 0.5 and 2 parts by weight, of crosslinker to 100 parts by weight of the polymer component. When trifunctional crosslinkers are used, their proportion is preferably to be added at 0.02 to 0.5 part by weight to 100 parts by weight of the polymer component, more preferably with 0.05 to 0.2 part by weight. It is, however, also possible to use crosslinkers with higher functionality. Furthermore, a plurality of crosslinkers may be used, which in terms of their functionality may be the same or different (for example, combination of difunctional and trifunctional crosslinkers). In that case the amounts used ought advantageously to be adapted.

Further components and/or additives, more particularly additives which are not incorporated into the polymer and/or which do not participate in the crosslinking reaction, are added to the comonomer mixture for polymerization, to the polymer at the polymerization stage, and/or to the fully polymerized polyacrylate, possibly, such addition taking place advantageously prior to the crosslinking reaction, and the aim of such addition being in particular to support the establishment of the desired product properties. There is no need for the presence of tackifier resins and plasticizers in the PSA used for the adhesive tape of the invention or for the adhesive tape used in accordance with the invention, and accordingly one outstanding variant embodiment of the adhesive tape of the invention has a PSA layer, and more particularly is realized by a PSA layer (single-layer, carrier-free adhesive tape) for which no resins and/or no plasticizers have been added to the PSA, and with particular advantage neither resins nor plasticizers have been added. Such additions frequently possess adverse effects in the context of application for optical bonds. The resins used in the prior art as tackifier resins for acrylate PSAs are customarily of polar nature, in order to achieve compatibility with the polyacrylate matrix. This usually results in the use of aromatic tackifier resins, which undergo yellowish discoloration on prolonged storage or on exposure to light.

For the production of a layer of PSA, the optionally additized polyacrylate, obtainable as set out above, is applied to one or both sides of a carrier, in which case it is possible to use a permanent carrier which is retained in the adhesive tape construction even in the application. With particular advantage, however, carrier-free, especially single-layer, adhesive tapes are produced, which in one very outstanding embodiment consist in application of the layer of PSA alone (so-called adhesive transfer tapes) and which, for prior handling, converting, and commercial offering, are provided on one or both sides with a temporary carrier, being more particularly wound up into a roll.

For the production of adhesive transfer tapes of this kind, the polyacrylate obtainable as set out above is coated advantageously onto a temporary carrier (more particularly, antiadhesive and/or antiadhesively furnished materials (referred to as liner materials, release materials, or release liners); such as, for example, siliconized papers, films, or the like) in the desired layer thickness. In principle it is possible here to use all release materials that are suitable for polyacrylate PSAs. Particular preference is given to using release liners having a PET carrier core.

Also possible for production are adhesive tapes having two layers of (pressure-sensitive) adhesive of different kinds, of which at least one of the layers is a PSA layer (of the invention) as described within this specification. The PSA layers may be directly adjacent to one another (two-layer adhesive tape), and optionally there may also be one or more further layers, such as carrier layers or the like, for example, between the two PSA layers (multilayer construction).

The polyacrylate is preferably crosslinked in the layer on the carrier material. The PSA is preferably formulated in such a way that the pressure-sensitive adhesive properties are suitable for the PSA to be used for the intended use described. With preference in accordance with the invention this is accomplished through the choice of the suitable degree of crosslinking of the polyacrylate. The polyacrylate is presently crosslinked to a degree of crosslinking which dictates realization of the specified parameters. By this means it is possible in particular to regulate the cohesion and the adhesion of the PSA and also its flow behavior.

In principle it is also possible for adhesive tapes of the invention to be obtained by crosslinking by means of UV radiation, in which case this crosslinking may be carried out alternatively or additionally to other crosslinking methods. This embodiment is not preferable here, however, since the UV absorbers present significantly lower the crosslinking efficiency for UV crosslinking.

In one very preferred procedure, the crosslinking of the polyacrylate may be brought about thermally (that is, by supply of thermal energy).

For the thermal crosslinking, the pressure-sensitive adhesive tapes of the invention are preferably passed through a drying tunnel. The drying tunnel fulfils two functions. Firstly, in the event the acrylate PSA has been coated from solution, the solvents are removed. This is accomplished generally by heating in stages, in order to avoid drying bubbles. Secondly, when a certain degree of drying has been reached, the heat is utilized in order to initiate the thermal crosslinking. The heat input required depends on the crosslinker system. Furthermore, according to crosslinking system, postcrosslinking reactions may occur. These are typical for isocyanate crosslinking, for example.

Especially for optical applications, the PSA, with a layer thickness of 50 µm between glass, has a transparency corresponding to a transmittance (emergent light intensity relative to irradiated light intensity, in percent) of at least 95% (after prior subtraction of the losses from reflection at the interfacial transitions of air/adhesive and adhesive/air) or of at least 89% (emergent light intensity relative to absolutely irradiated light intensity, without subtraction of the components reflected at the air/adhesive and adhesive/air interfacial transitions from the irradiated light intensity). With further advantage the PSA has a haze of at most 5%, preferably less than 3%, very preferably less than 1%.

The invention further relates to the use of the adhesives of the invention and to the use of the adhesive tapes of the invention for the adhesive bonding of substrates on electrically conductive films, more particularly such films in optical, electronic, or optoelectronic devices, and/or such films for producing touch-sensitive screens and/or for generating an electrical field.

It is advantageous for this purpose for at least one of the substrates to be optically transparent, consisting in particular of glass or of polycarbonate. In a particularly preferred embodiment of the invention, the electrically conductive film is a film with nanoscale silver wires on the surface or with an indium tin oxide (ITO) layer.

The adhesive tape may be laminated directly on one or two sides of an optical element. Optical elements may be, for example, polarizer films or brightness enhancement films or 3D films. Furthermore, the optical clear pressure-sensitive adhesive tape may also be laminated onto display units. In this way, for example, touch panel units can be bonded with the display or else polarizer films can be bonded with the display. Moreover, the adhesive tape is used very preferably for producing the touch panel units. Here there are likewise different combinations according to touch panel type. Hence the pressure-sensitive adhesive tape is suitable for glass/glass bonds or glass/film touch panels or else glass/film/film touch panels, the film always representing an ITO film of at least one ITO layer. The ITO may alternatively be coated directly on the glass. With particular preference the adhesive tape of the invention is suitable for bonding on ITO surfaces.

The adhesive tape of the invention is especially suitable for permanent bonds, these being more particularly bonds where the adhesive connection is to be durably retained. The bonds can also be carried out over large surface areas and can also be exposed to high temperatures.

Relatively high long-term temperature loads may come about as a result of external influences (insolation) or as a result of heat produced within the electronic device. There is a general increase in such heat, since processor power is continually rising and there is less and less space within the housing available for the components as a result of slimmer designs. The adhesive tape of the invention exhibits a b* of less than 1.5, very preferably of less than 1, under storage conditions typical for the touch panel industry, such as one month at 70° C. or 1000 h at 85° C. and 85% r.h. Higher levels would customarily be perceived as significant yellow coloration, and are therefore unacceptable for optical applications. As well as the temperature stability and also the stability under hot and humid conditions, compatibility with the ITO film for bonding is important, and also the possibility for the adhesive tape of the invention to protect this ITO film. After storage under UV light, such as under the conditions of the accelerated aging test by means of UV light (referred to as the "QUV test"; see test method H), for example, the ITO film exhibits a marked tendency toward yellow coloration and also toward an increase in the electrical resistance. These changes are a problem in the application of bonding in the image-representing area of the display. Yellow clouding is therefore undesirable. Moreover, large changes in the electrical resistance of the ITO film are undesirable, since they alter the sensitivity of the touch panel over a prolonged time period. The examples according to the invention are characterized in that the electrical conductivity changes less than 10% after storage for 500 h under the conditions of the accelerated aging test by means of UV light (test method H). Moreover, after storage for 500 h under the conditions of the accelerated aging test by means of UV light (test method H), for a laminate of glass, adhesive of the invention, and ITO film, the b* rises by less than 100%, preferably less than 50%. The adhesives of the invention can also be used, however, for all other optical bonds, and are not useful solely on ITO films. For instance, alternative forms of electrically conductive materials are increasingly being used as well, such as, for example, for large displays, copper tracks or more recent technologies such as conductive silver or conductive polymers and carbons. Further optical elements as well can be protected by the PSAs of the invention. One possibility, for example, are OLED materials, which may likewise have high UV sensitivity.

EXPERIMENTAL SECTION

Properties of the Raw Materials Used:

| | |
|---|---|
| Desmodur ® N75 | Aliphatic polyisocyanate (HDI biuret). 75% in butyl acetate, produced by Bayer |
| Tinuvin ® 928 | Benzotriazole compound produced by BASF, 2-(2H-benzotriazol-2-yl)-6-(1-methyl-1phenylethyl)-4-(1,1,3,3-tetramethylbutyl)phenol |
| Tinuvin ® 328 | Benzotriazole compound produced by BASF, 2-(2H-benzotriazol-2-yl)-4,6-di-tert-pentylphenol |
| Tinuvin ® 400 | Hydroxyphenyltriazine produced by BASF, 2-[4-[2-hydroxy-3-tridecyloxypropyl]oxy]-2-hydroxyphenyl]-4,6-bis(2,4-dimethylphenyl)-1,3,5-triazine and 2-[4-[2-hydroxy-3-didecyloxypropyl]oxy]-2-hydroxyphenyl]-4,6-bis(2,4-dimethylphenyl)-1,3,5-triazine |
| Tinuvin ® 384 | Benzotriazole produced by BASF 95% benzenepropanoic acid, 3-(2H-benzotriazol-2-yl)-5-(1,1-dimethylethyl)-4-hydroxy-, C7-9-branched and linear alkyl esters 5% 1-methoxy-2-propyl acetate |
| Tinuvin ® 622 | Butanedioic acid dimethyl ester, polymer with 4-hydroxy-2,2,6,6-tetramethyl-1-piperidineethanol, produced by BASF |
| Tinuvin ® 312 | N-(2-ethoxyphenyl)-N'-(2-ethylphenyl)ethanediamide, produced by BASF |
| Tinuvin ® 144 | Bis(1,2,2,6,6-pentamethyl-4-piperidyl) [[3,5-bis(1,1-dimethylethyl)-4-hydroxyphenyl]methyl]butylmalonate, produced by BASF |

Test Methods:

A. Rheometer Measurements

The measurements were carried out using a RDA II rheometer from Rheometrics Dynamic Systems in plate-on-plate configuration. The article measured was a round sample having a sample diameter of 8 mm and a sample thickness of 1 mm.

The sample was obtained by laminating together 20 layers of the adhesive sheets produced as above, which for this purpose were freed from the respective carrier material, to give a carrier-free adhesive sheet 1 mm thick from which the round sample could be diecut.

Measuring conditions: temperature sweep from −30 to 130° C. at 10 rad/s.

B. Transmittance

The transmittance in a range between 200 and 800 nm was determined according to ASTM D1003. The subject of the measurement was the assembly formed from optically transparent PSA and glass plate. Important for assessing the UV absorber efficiency are the absorption at 360 nm, in a range between 250 and 360 nm, and at 360 nm. For optically transparent PSAs, the transparency between 400 and 800 nm ought to be greater than 90%.

C. Haze

The haze is determined according to ASTM D1003, procedure A.

D. Test for ITO Electrical Conductivity

The PSA is bonded as a single-sided pressure-sensitive adhesive tape on an ITO film (Elecrysta® V270L-TFMP) from Nitto Denko. The dimensions of the ITO film are 46 mm×60 mm. The bonding area additionally for the conductive silver paste is 8 mm×2 mm.

The electrical measurements are performed using an Agilent U 1252A multimeter. The measurement is carried out at 23° C. and 50% r.h. The parameter measured is the surface resistance according to DIN 53482. The aging is carried out in analogy to test method H.

The measurement result is held as surface resistance R in Ω. The percentage increase or fall can be determined by measuring the initial figure and also by measurement after storage.

E. Molecular Weight Determinations

The weight-average molecular weight $M_w$ was determined by means of gel permeation chromatography (GPC). The eluent used was THF with 0.1 vol % of trifluoroacetic acid. The measurement took place at 25° C. The precolumn used was PSS-SDV, 5µ, $10^3$ Å, ID 8.0 mm×50 mm. Separation took place using the columns PSS-SDV, 5µ, $10^3$ and also $10^5$ and $10^6$ each with ID 8.0 mm×300 mm. The sample concentration was 4 g/l, the flow rate 1.0 ml per minute. Measurement took place against PMMA standards. (µ=µm; 1 Å=$10^{-10}$ m).

F. LAB Measurement

The LAB measurement was made according to DIN 5033-3.

Light source/standard illuminant: D65
Observer angle: 10°

The transparent specimen was measured against a white reference tile. The data measured are plotted relatively as L*a*b* values against the white reference tile, and are calculated as follows: $a^* = a^*_{exp} - a^*_{ref}$ and $b^* = b^*_{exp} - b^*_{ref}$ and $L^* = (100 \times L^*_{exp})/L^*_{ref}$. The yellow coloration b* in particular is relevant for the application. The plotting of the other figures is therefore not done.

G. Aging

The aging took place in the free film on the release liners. The specimens were stored at 70° C. for a month in a drying cabinet. In parallel, in a hot and humid cabinet, these specimens were stored in the free film on the release liners for 1000 h at 85° C. and 85% r.h. Aging was followed in general by the LAB measurement according to method F.

H. Accelerated Aging Test by Means of UV Light

The aging of the ITO film was carried out by means of the accelerated aging test by means of UV light according to DIN EN ISO 4892-3 (so-called "QUV test"). The radiation of the UV lamp at 340 nm was 0.76 W/m². In analogy to the stated DIN-EN-ISO standard, irradiation took place in cycles at 60° C. for 8 hours and also by wetting at 50° C. for four hours. The test ran for 500 hours. Evaluations were made of the pure ITO film (Nitto Elecrysta® V270L-TFMP) and also of the laminate formed from 0.7 mm of quartz glass, 100 µm of the single-layer adhesive tape of the invention with UV-absorbing properties, and Nitto Elecrystal® V270L-TFMP. For the evaluation, LAB measurements were carried out according to test method F LAB, and a determination was made of the b*.

Polymerizations of the Polyacrylate

Polyacrylate

A 200 L reactor conventional for radical polymerizations was charged with 10.5 kg of 2-hydroxyethyl acrylate, 59.5 kg of 2-ethylhexyl acrylate, and 53.3 kg of ethyl acetate/toluene (42.6 kg/10.7 kg). After nitrogen gas has been passed through the reactor for 45 minutes, with stirring, the reactor was heated to 70° C. and 30 g of 2,2'-azoisobutyronitrile (AIBN) were added. The external heating bath was subsequently heated to 75° C. and the reaction was carried out constantly at this external temperature. After a reaction time of one hour a further 30 g of AIBN were added. After 5 hours and after 10 hours, dilution took place with 15 kg of ethyl acetate/toluene (90:10) each time. After 6 hours and after 8 hours, additions were made in each case of 100 g of dicyclohexyl peroxydicarbonate (Perkadox 16®, Akzo Nobel) in solution in 800 g of acetone in each case. After a reaction time of 24 hours, the reaction was discontinued and the product was cooled to room temperature. GPC analysis showed an $M_w$ of 882 000 g/mol.

Crosslinking

The PSA was subsequently blended to 0.2 weight fractions of Desmodur N75 from Bayer AG, adjusted to a solids content of 28% by dilution with toluene, and then coated out onto a Nippa PET release liner 50 µm thick. This is followed by drying at room temperature for 15 minutes initially, then at 120° C. for 15 minutes in a drying cabinet. The thickness after coating was 100 µm. The specimens—before being subjected to further measurement and evaluation—were stored at room temperature for seven days. The tan δ after crosslinking is about 0.2, measured at 10 rad/s and 130° C. (see test method A).

Additization with UV Absorbers/Production of the Examples and Reference Examples A procedure analogous to "Crosslinking" was followed, in which the amounts of crosslinker were held constant. As well as the crosslinker, one or more UV additives were added and were likewise dissolved in the polymer with stirring. This is followed in turn by coating—in analogy to the "Crosslinking" with 28% solids content. Thickness of the specimens, drying, and storage took place under identical conditions. The UV absorbers used had no substantial influence on the degree of crosslinking. For all of the specimens, the tan δ is about 0.2; measured at 10 rad/s and 130° C. (see test method A).

Overview of the Examples

The table below lists the inventive examples and also their composition:

|  | Benzotriazole [wt % based on 100% polymer] | Malonate [wt % based on 100% polymer] | Ethanediamide [wt % based on 100% polymer] | Polymeric piperidine [wt % based on 100% polymer] |
| --- | --- | --- | --- | --- |
| Example 1 | 0.75% Tinuvin 328 ® | 0.5% Tinuvin ® 144 | 1.0% Tinuvin ® 312 | 0.5% Tinuvin ® 622 |
| Example 2 | 1.0% Tinuvin 328 ® | 1% Tinuvin ® 144 | — | — |
| Example 3 | 1.0% Tinuvin 328 ® | 0.5% Tinuvin ® 144 | 0.5% Tinuvin ® 312 | — |
| Example 4 | 1.0% Tinuvin 328 ® | 0.25% Tinuvin ® 144 | 1.0% Tinuvin ® 312 | 2% Tinuvin ® 622 |
| Example 5 | 1.0% Tinuvin 328 ® | 2% Tinuvin ® 144 | 1.0% Tinuvin ® 312 | 0.25% Tinuvin ® 622 |
| Example 6 | 2.0% Tinuvin 328 ® | 0.5% Tinuvin ® 144 | 0.25% Tinuvin ® 312 | 0.5% Tinuvin ® 622 |
| Example 7 | 1.0% Tinuvin ® 928 | 0.5% Tinuvin ® 144 | 1.0% Tinuvin ® 312 | 0.5% Tinuvin ® 622 |

-continued

| | Benzotriazole [wt % based on 100% polymer] | Malonate [wt % based on 100% polymer] | Ethanediamide [wt % based on 100% polymer] | Polymeric piperidine [wt % based on 100% polymer] |
|---|---|---|---|---|
| Reference example 1 | — | — | — | — |
| Reference example 2 | 0.5% Tinuvin ® 328 | — | — | — |
| Reference example 3 | 1.0% Tinuvin ® 328 | — | — | — |
| Reference example 4 | 2.0% Tinuvin ® 328 | — | — | — |
| Reference example 5 | 0.75% Tinuvin ® 928 | — | — | — |
| Reference example 6 | 1.0% Tinuvin ® 384 | — | — | — |
| Reference example 7 | 1.0% Tinuvin ® 400* | — | — | — |
| Reference example 8 | 2.0% Tinuvin ® 400* | — | — | — |
| Reference example 9 | 3.0% Tinuvin ® 400* | 0.5% Tinuvin ® 144 | — | — |

*Triazine derivative and no benzotriazole derivative

As a first basic criterion, the optical measurements were carried out. The measurements were carried out by test methods B and C. The data measured are collated in the table below:

| | Transmittance at 360 nm [%] | Transmittance at 260 nm [%] | Transmittance at 550 nm [%] | Haze [%] |
|---|---|---|---|---|
| Example 1 | 0.16% | 0.05% | >89% | <1% |
| Example 2 | 0.01% | 0.12% | >89% | <1% |
| Example 3 | 0.01% | 0.08% | >89% | <1% |
| Example 4 | 0.01% | 0.05% | >89% | <1% |
| Example 5 | 0.01% | 0.01% | >89% | <1% |
| Example 6 | <0.01% | 0.05% | >89% | <1% |
| Example 7 | 0.01% | 0.06% | >89% | <1% |
| Reference example 1 | 89% | 71% | >89% | <1% |
| Reference example 2 | 1% | 33% | >89% | <1% |
| Reference example 3 | 0.01% | 18% | >89% | <1% |
| Reference example 4 | <0.01% | 6.4% | >89% | <1% |
| Reference example 5 | 0.16% | 27% | >89% | <1% |
| Reference example 6 | 0.11% | 26% | >89% | <1% |
| Reference example 7 | 4.3% | 0.5% | >89% | <1% |
| Reference example 8 | 0.27% | <0.01% | >89% | <1% |
| Reference example 9 | 0.03% | <0.01% | >89% | <1% |

From the measurements it can be seen that although reference example 1 has a high transmittance and a low haze in the visible range—a high transmittance of greater than 89% at 550 nm and a low haze of less than 1% were measured for all the samples—it nevertheless also had a very high transmittance in the UV range at 260 and 360 nm. Adhesives of this kind therefore offer no protection from UV radiation. Reference example 2 demonstrates that with even small amounts of benzotriazole compounds it is possible to achieve low transmittance of 360 nm (1%), but that the transmittance at 260 nm, at 33%, is still much too high. For reference example 3, the benzotriazole content was raised further (to 1 wt %). This produces a drop in transmittance in the UV range at 360 nm to well below 1. The transmittance at 260 nm, however, is still 20%, and is therefore much too high. If, in contrast, the benzotriazole content is raised further to 2 wt %, there is also a further decrease in the transmittance. Here, accordingly, the transmittance of 360 nm is less than 0.01%, and at 260 nm is now 6.4%.

For reference example 5, the benzotriazole derivative was switched. Added here now is Tinuvin® 928 at 1%. The picture is relatively similar to Tinuvin® 328. Here again, a low transmittance is measured at 360 nm, and a relatively high transmittance, at 27%, at 260 nm.

In the case of reference example 6 a further benzotriazole derivative was used. Added here now is Tinuvin® 384 at 1%. The picture is relatively similar to Tinuvin® 328. Here as well a low transmittance is measured at 360 nm and a relatively high transmittance, at 26%, at 260 nm.

In reference example 7 a further class of UV absorber was tested. In this case, triazine compounds are used as UV absorbers. With these compounds as well, the UV absorption at 360 nm is relatively high, at 4.3%. But the transmittances at 260 nm are lower in comparison to benzotriazole derivatives. Thus at 260 nm a figure of 0.49% is measured. In reference example 8, therefore, the proportion of Tinuvin® 400 was again raised further to 2%. The transmittance here at 360 nm is still relatively high, at 0.26%. At 260 nm, in contrast, less than 0.01% is measured. A further improvement can be achieved by again increasing the Tinuvin 400 content to 3% (see reference example 9). With these quantities, the transmittance measured at 360 nm is 0.03% and the transmittance measured at 260 nm is <0.01%. Among the reference examples, therefore, reference example 9 meets the requirements imposed on a UV-absorbing, optically clear adhesive.

All of the inventive examples—even with combination of the different additions, namely substituted malonate, substituted ethanediamide, and polymeric piperidine—meet the requirements imposed on a UV-absorbing, optically clear adhesive. Here it is possible if desired to do without the additions of substituted ethanediamide and of polymeric piperidine, even if the transmittance at 260 nm may then rise above 0.1% (see example 2). At 0.12%, however, the absolute value is still very good and is below 0.2%.

As well as the measurement of transmittance, the degree of yellow coloration is a further critical factor for the optical characteristics. Adhesives which have low transmittance of 360 nm in particular generally have a tendency toward yellow coloration. The yellow coloration of the all the specimens was determined, therefore. Aromatic compounds, moreover, also have a tendency likewise toward yellow coloration if stored at high temperatures and humidities. In accordance with test method G, therefore, aging was carried out under two different conditions. The results are set out in the table below.

|  | b* (untreated specimen) | b* after 1 month, 70° C. | b* after 1000 h, 85° C., 85% r.h. |
| --- | --- | --- | --- |
| Example 1 | 0.44 | 0.69 | 0.24 |
| Example 2 | 0.53 | 0.83 | 0.95 |
| Example 3 | 0.61 | 0.76 | 0.88 |
| Example 4 | 0.56 | 0.63 | 0.84 |
| Example 5 | 0.64 | 0.71 | 0.93 |
| Example 6 | 0.79 | 0.87 | 1.15 |
| Example 7 | 0.74 | 0.72 | 0.94 |
| Reference example 1 | 0.08 | 0.16 | 0.24 |
| Reference example 2 | 0.31 | 0.52 | 0.69 |
| Reference example 3 | 0.52 | 0.81 | 0.97 |
| Reference example 4 | 0.71 | 0.93 | 1.22 |
| Reference example 5 | 0.60 | 0.65 | 0.86 |
| Reference example 6 | 0.37 | 0.81 | 0.91 |
| Reference example 7 | 0.27 | 0.59 | 0.74 |
| Reference example 8 | 0.57 | 0.92 | 1.32 |
| Reference example 9 | 0.59 | 1.24 | 1.67 |

From the table it can be seen that in the case of fresh specimens of the adhesives there is as yet no yellow coloration. All b* values lie below 1. Moreover, reference example 1 shows that without aromatic additions the polyacrylate adhesive has only a low tendency toward yellowing. Through the high additization of triazine in the case of reference example 9, there is a marked rise in the b* value after aging. Both after storage at 70° C. for a month and after storage at 85° C./85% r.h. over a period of 1000 h, the values have risen above 1. In the storage test at 85° C./85% r.h., indeed, a b* value of more than 1.5 was measured for reference example 9. As a result of the lower proportion in the polymer, the yellow coloration exhibited by the benzotriazole derivatives (inventive examples 1-7) is somewhat lower. For up to 2% wt % of benzotriazole derivative, the b* value in all cases is below 1.0 at 70° C. storage for a month, and below 1.5 for storage at 85° C./85% r.h. By reducing the proportion to 1% it is also possible to lower the b* value to below 1.0 for storage at 85° C./85% r.h.

The experiments demonstrate that only by means of a combination of at least one benzotriazole derivative with bis(1,2,2,6,6-pentamethyl-4-piperidyl) [[3,5-bis(1,1-dimethylethyl)-4-hydroxyphenyl]methyl]butylmalonate is it possible on the one hand to achieve a low transmittance at 260 and 360 nm of less than 0.2% and secondly also for the b* values after aging to rise only moderately, meaning that still no significant yellow coloration is achieved on heat exposure.

In order to evaluate the efficiency of the UV-absorbing, optically clear adhesives of the invention, QUV aging tests were carried out on the ITO film in accordance with test method H. The aging mechanisms differ in the case of thermal storage under hot and humid conditions, or by UV irradiation. These experiments were now also carried out, for supplementation, with UV light, therefore. Used as examples for this purpose were inventive examples 1, 4 and 6 and also reference example 1. The results are assembled in the table below.

|  | b* of ITO film* | b* of ITO film after 500 h QUV* | b* of ITO film with inventive adhesive layer (OCA) and quartz glass | b* of ITO film with inventive adhesive layer and quartz glass after 500 h QUV |
| --- | --- | --- | --- | --- |
| Example 1 | 1.21 | 5.60 | 1.66 | 2.31 |
| Example 4 | 1.21 | 5.60 | 1.72 | 2.36 |
| Example 6 | 1.21 | 5.60 | 1.94 | 2.49 |
| Reference example 1 | 1.21 | 5.60 | 1.54 | 4.22 |

*same initial value, since no contact with OCA.

The results demonstrate that through the use of the UV-absorbing, optically clear adhesives of the invention it is possible to achieve a marked reduction in the yellow coloration under UV aging. Accordingly, there is in fact a slight increase in the b* value of the laminate relative to the reference example 1. After aging, however, the b* values are well below those of the reference example and also well below that of the pure ITO film after UV aging. Hence example 1 shows a percentage increase in the yellow value b* of 39%, example 4 of 37%, example 6 of 28%, and reference example 1 of 174%.

In order now to investigate the effect of the UV-absorbing, optically clear adhesives of the invention on the ITO film and on its function as an electrically conductive layer, the electrical conductivities as well were determined after the QUV storage tests. The results are set out in the table below (see test method D).

|  | Resistance R of the ITO film in Ω (*) | Resistance R of the ITO film after 500 h QUV in Ω (*) | Resistance R of the ITO film with applied inventive adhesive layer in Ω | Resistance R of the ITO film with applied inventive adhesive layer after 500 h QUV in Ω |
| --- | --- | --- | --- | --- |
| Example 1 | 748 | 1820 | 444 | 428 |
| Example 4 | 748 | 1820 | 441 | 429 |
| Example 6 | 748 | 1820 | 458 | 435 |
| Reference example 1 | 748 | 1820 | 464 | 402 |

(*) same initial value, since no contact with inventive adhesive layer
The ITO film was in each case conditioned beforehand at 140° C. for 30 minutes.

From the table it can be inferred that the pure ITO film undergoes relatively severe aging without an applied adhesive layer of the invention. The resistance of the pure film rises from 748Ω to 1820Ω. Through the production of an assembly of glass, inventive adhesive layer, and ITO film, there is a reduction in the aging behavior. For reference example 1 there is a marked decrease in the resistance. For inventive examples 1, 4 and 6, the electrical conductivity remains relatively constant even after QUV storage, and is below 10% of the original figure. The deviation is −3.6% for example 1, −2.7% for example 4, and −5.0% for example 3. Reference example 1, in contrast, shows a deviation of −13%. The inventive examples therefore not only have a positive effect on yellow coloration but also a greater constancy with regard to the electrical conductivity.

The invention claimed is:

1. An adhesive tape comprising a layer of a pressure-sensitive acrylate adhesive comprising a polymer component and three additives, the polymer component being formed of one or more copolymers based on the following monomers:
   a) 5 to 35 wt % of one or more hydroxyl-containing monomers with a copolymerizable double bond,
   b) 0 to 50 wt % of one or more acrylate and/or methacrylate monomers with in each case at least one amide group, urethane group, urea group, carboxylic anhydride unit and/or ethylene glycol unit,
   c) 15 to 95 wt % of an alkyl (meth)acrylate, the alkyl radical having 1 to 14 carbon atoms,
   wherein the pressure-sensitive acrylate adhesive has been admixed with:
   one or more 2-(2H-benzotriazol-2-yl) derivatives as a first additive,
   one or more [[3,5-bis(1,1-dimethylethyl-4-hydroxy-phenyl)methyl]alkylmalonate derivatives as a second additive, and
   N-(2-ethoxyphenyl)-N'-(2-ethylphenyl) ethanediamide as a third additive.

2. The adhesive tape as claimed in claim 1, wherein the one or more 2-(2H-benzotriazol-2-yl) derivatives is present in the pressure-sensitive acrylate adhesive in an amount such that the product of the thickness of the layer of pressure-sensitive acrylate adhesive and the amount of the 2-(2H-benzotriazol-2-yl) derivatives is present in the range from 75 to 200 g*μm per 100 g of the polymer component.

3. The adhesive tape as claimed in claim 1, wherein the one or more 2-(2H-benzotriazol-2-yl) derivative is a 2-(2H-benzotriazol-2-yl)phenol derivative.

4. The adhesive tape as claimed in claim 1, wherein the one or more [[3,5-bis(1,1-dimethylethyl-4-hydroxyphenyl)-methyl]alkylmalonate derivatives is present in the pressure-sensitive acrylate adhesive in an amount such that the product of the thickness of the layer of pressure-sensitive acrylate adhesive and the amount of the [[3,5-bis(1,1-dimethylethyl-4-hydroxyphenyl)methyl]alkylmalonate derivatives is present in the range from 25 to 200 g*μm per 100 g of the polymer component.

5. The adhesive tape as claimed in claim 1, wherein the one or more [[3,5-bis(1,1-dimethylethyl)-4-hydroxyphenyl)methyl]alkylmalonate derivatives is [[3,5-bis[(1,1-dimethylethyl)-4-hydroxyphenyl]methyl]butylmalonates.

6. The adhesive tape as claimed in claim 1, wherein the one or more diaromatically functionalized ethanediamide derivatives is present in the pressure-sensitive acrylate adhesive in an amount such that the product of the thickness of the layer of pressure-sensitive acrylate adhesive and the amount of the N-(2-ethoxyphenyl)-N'-(2-ethylphenyl) ethanediamide is present in the range from 25 to 200 g*μm per 100 g of the polymer component.

7. The adhesive tape as claimed in claim 1, wherein one or more hindered piperidine derivatives have been admixed as in the pressure sensitive acrylate adhesive further additives.

8. The adhesive tape as claimed in claim 7, wherein the one or more hindered piperidine derivatives is present in the pressure-sensitive acrylate adhesive in an amount such that the product of the thickness of the layer of pressure-sensitive acrylate adhesive and the amount of the diaromatic hindered piperidine derivatives is present in the range from 25 to 200 g*μm per 100 g of the polymer component.

9. The adhesive tape as claimed in claim 7, wherein the one or more hindered piperidine derivative is the polymeric reaction product of 4-hydroxy-2,2,6,6-tetramethyl-1-piperidineethanol and of dimethyl butanedioate.

10. The adhesive tape as claimed in claim 1, wherein the one or more copolymers of the polymer component each have a weight-average molecular weight $M_w$ in the range from 200 000 g/mol to 3 000 000 g/mol.

11. The adhesive tape as claimed in claim 1, wherein the pressure-sensitive acrylate adhesive is in a form free from tackifier resin.

12. The adhesive tape as claimed in claim 1, wherein the layer of pressure-sensitive acrylate adhesive has a thickness in the range from 10 to 500 μm.

13. The adhesive tape as claimed claim 1, in the form of a single-layer, double-sidedly bonding adhesive tape, consisting of the layer of pressure-sensitive acrylate adhesive.

14. The adhesive tape as claimed in claim 13, wherein the layer of pressure-sensitive acrylate adhesive is lined on one or both sides with a temporary carrier material.

15. A method of bonding substrates to electrically conductive films comprising applying an adhesive tape as claimed in claim 1.

* * * * *